United States Patent [19]

Brigati et al.

[11] Patent Number: 5,760,638
[45] Date of Patent: Jun. 2, 1998

[54] PHASE GENERATOR CIRCUIT FOR CHARGE PUMP TYPE OR NEGATIVE SUPPLY CIRCUIT

[75] Inventors: Alessandro Brigati, Aix en Provence; Nicolas Demange, Lessy; Maxence Aulas, St Haon le Vieux; Marc Guedj, Pont Saint Esprit, all of France

[73] Assignee: SGS-Thomson Microelectronics S.A., Saint Genis, France

[21] Appl. No.: 664,083

[22] Filed: Jun. 13, 1996

[30] Foreign Application Priority Data

Jun. 21, 1995 [FR] France .................. 95 07618

[51] Int. Cl.$^6$ .................................................. H03K 3/06
[52] U.S. Cl. ............... 327/536; 327/258; 327/259; 327/530; 327/291; 327/295; 327/239; 327/306; 327/589; 327/390; 307/110
[58] Field of Search ..................... 327/390, 534, 327/535, 536, 537, 566, 589, 258, 259, 530, 291, 295, 231, 239, 306; 307/110; 363/20

[56] References Cited

U.S. PATENT DOCUMENTS

| | | | |
|---|---|---|---|
| 5,043,858 | 8/1991 | Watanabe | 363/61 |
| 5,077,691 | 12/1991 | Haddad et al. | 365/218 |
| 5,097,226 | 3/1992 | Pascucci et al. | 331/46 |
| 5,381,051 | 1/1995 | Morton et al. | 327/589 |

OTHER PUBLICATIONS

French Search Report from French Patent Application 95 07618, filed Jun. 21, 1995.

*Primary Examiner*—Timothy P. Callahan
*Assistant Examiner*—Dinh T. Le
*Attorney, Agent, or Firm*—Wolf, Greenfield & Sacks, P.C.; James H. Morris

[57] ABSTRACT

A phase generator circuit cyclically produces a first pair of phase signals and a second pair of phase signals, comprising a first circuit to produce a first phase of each pair of phase signals, these first phase signals being non-overlapping and switching over between a voltage 0 and a voltage VCC, and second and third circuits for the production, from the first phase signals, respectively of the second phase of the first pair and the second phase of the second pair of phase signals, these second phase signals being non-overlapping with the first phase signals and switching over between a negative voltage −V and a voltage VCC. The disclosure finds application in the piloting of charge pump type of negative voltage generator circuit.

21 Claims, 3 Drawing Sheets

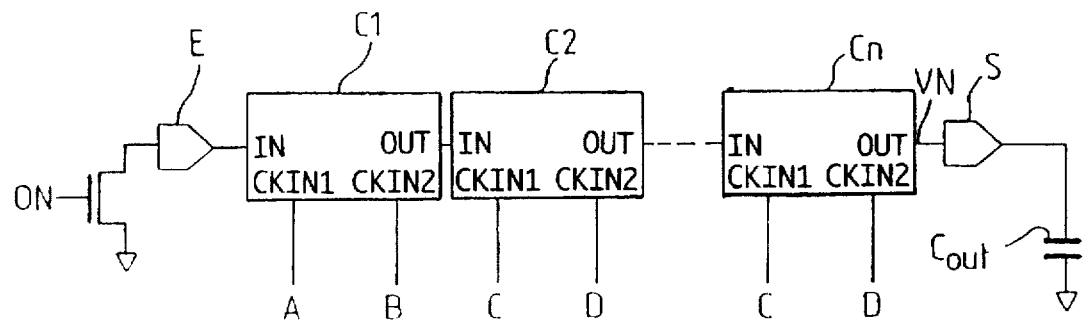
FIG_1
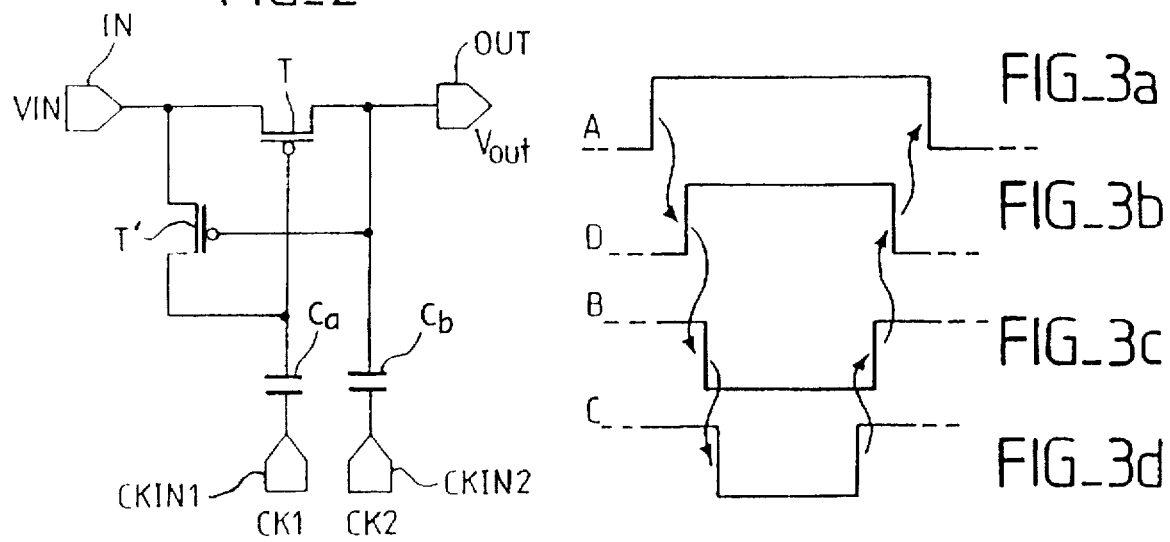
FIG_2
FIG_3a
FIG_3b
FIG_3c
FIG_3d
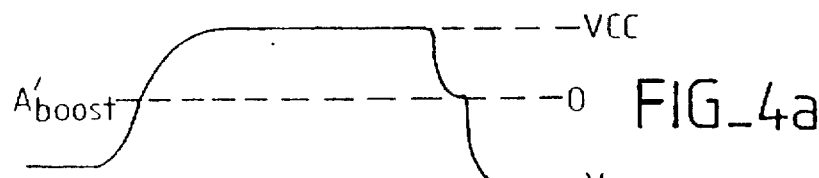
FIG_4a
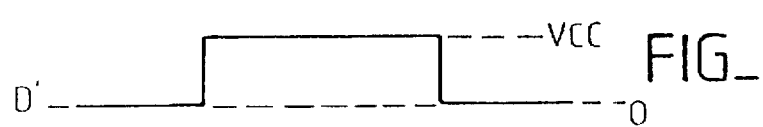
FIG_4b
FIG_4c
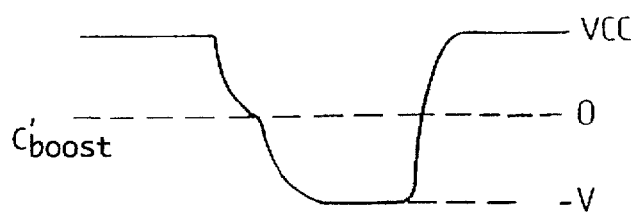
FIG_4d

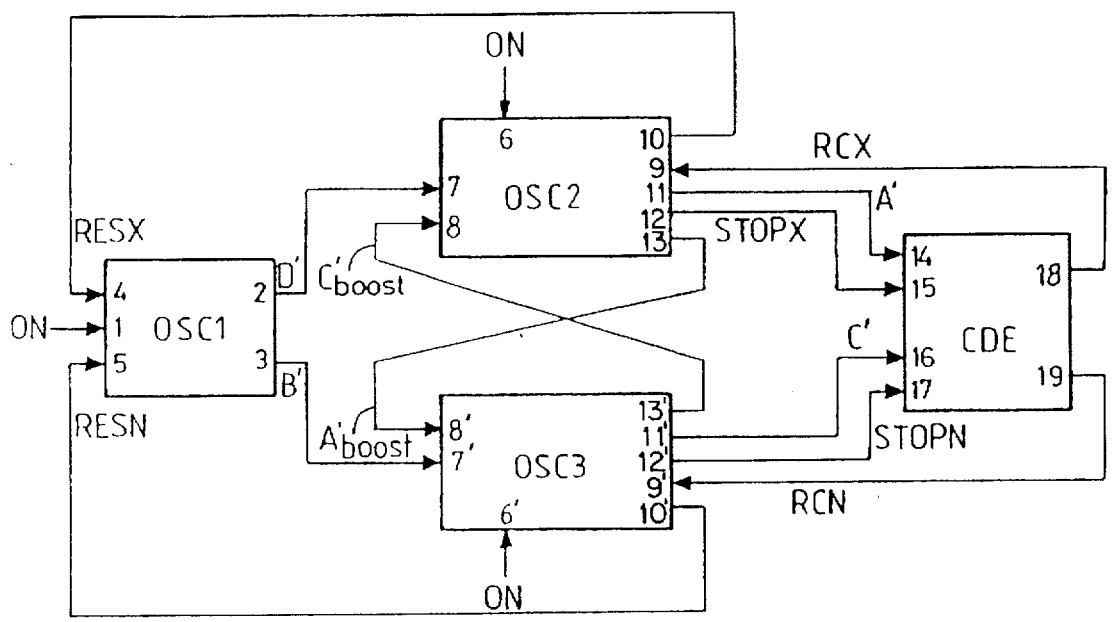
FIG_5
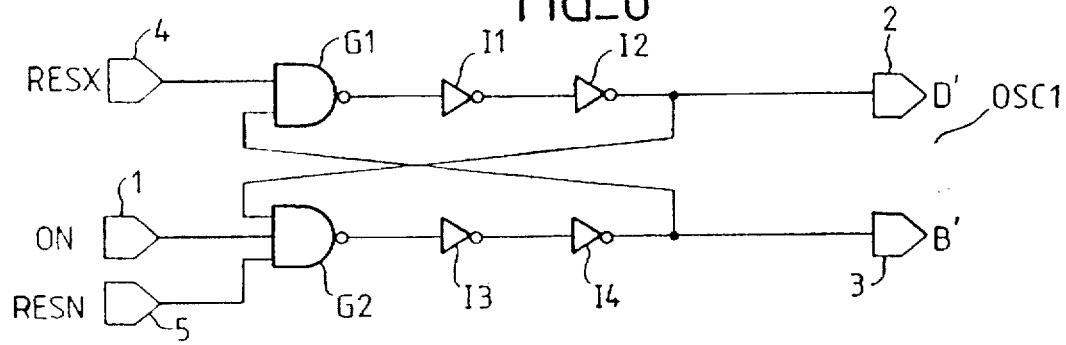
FIG_6
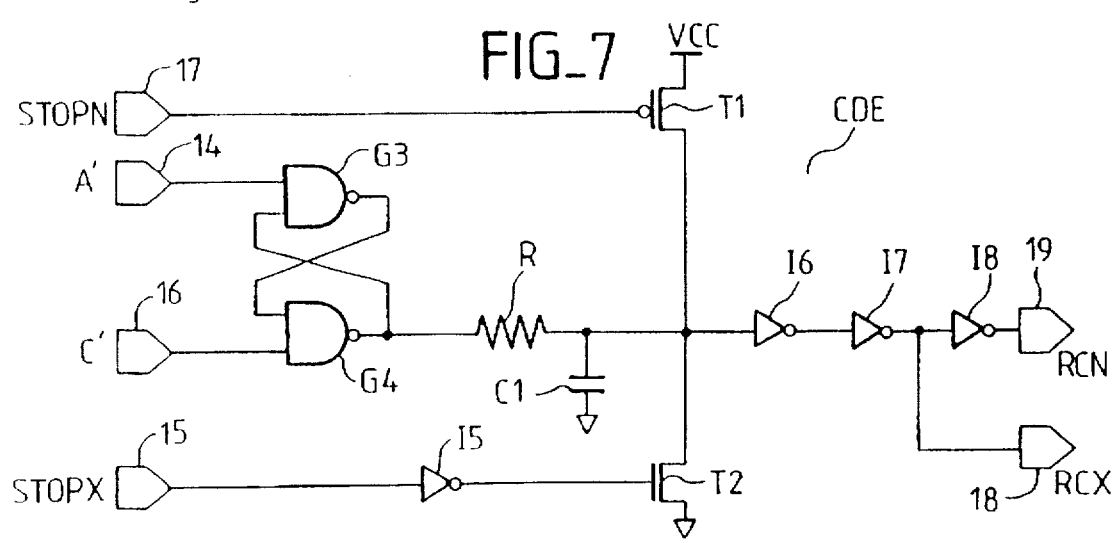
FIG_7

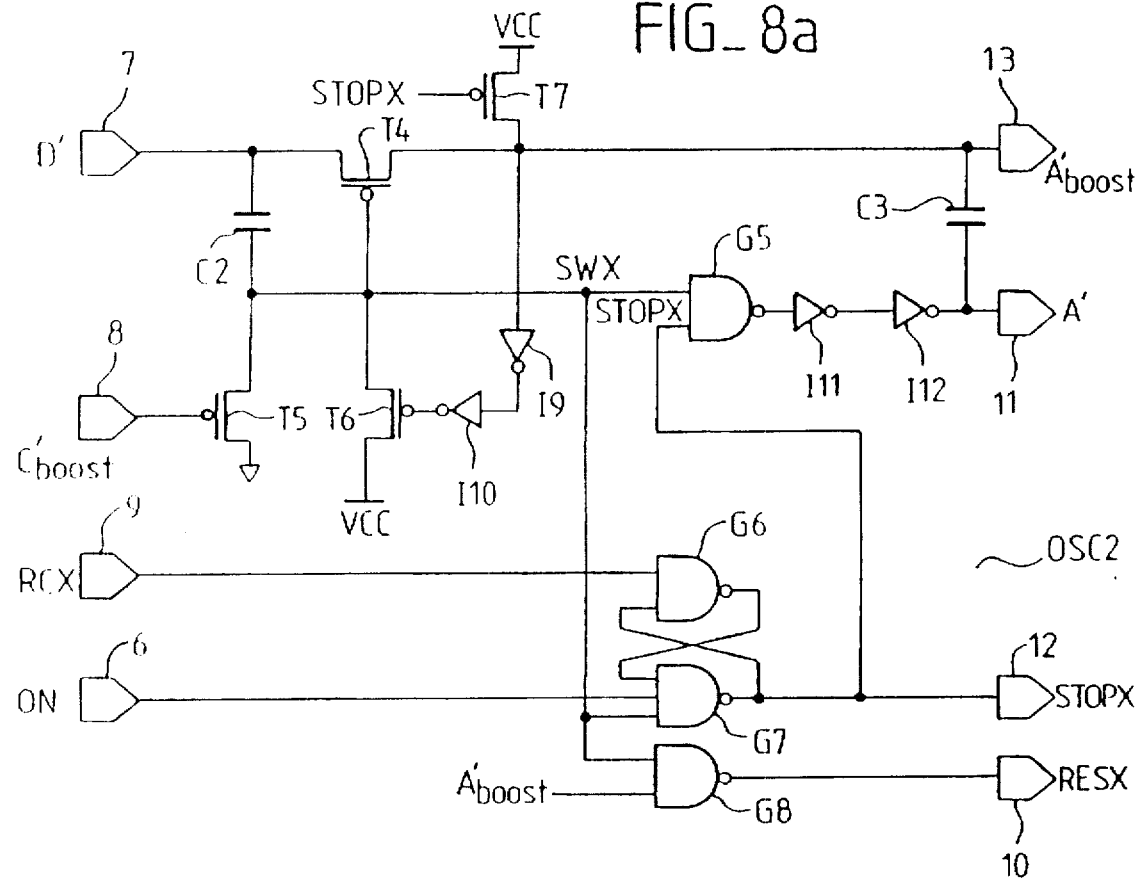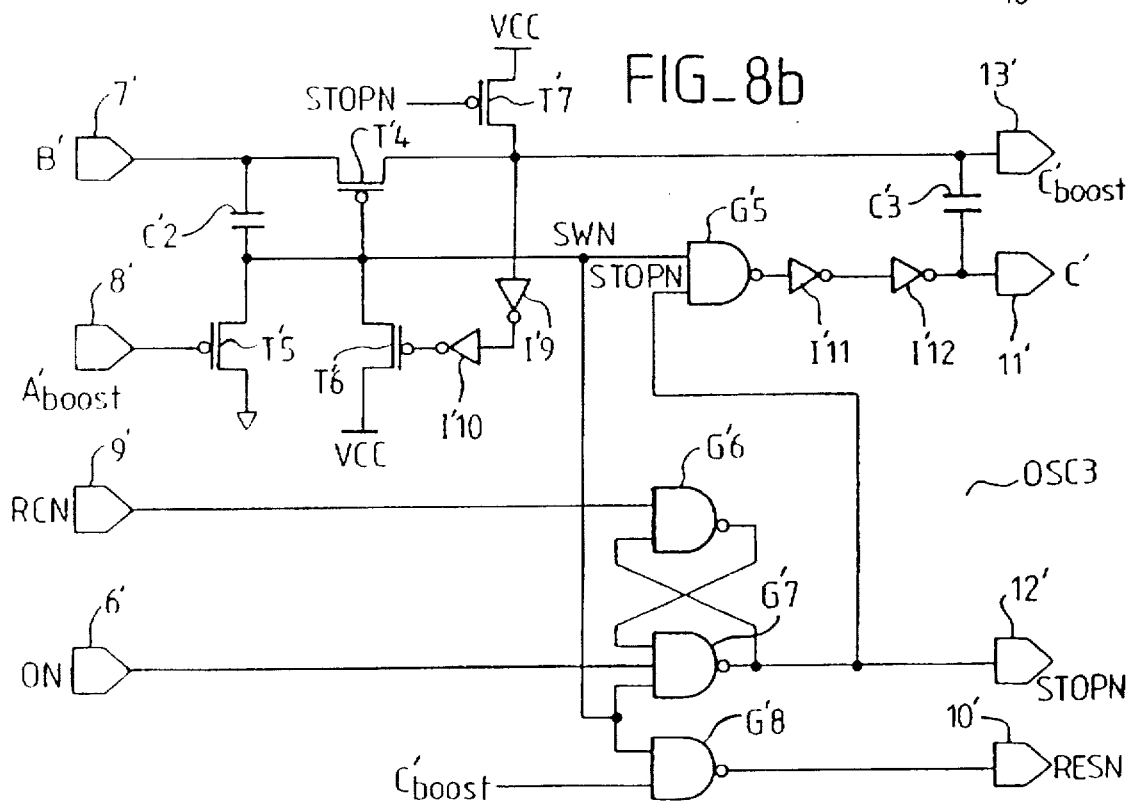

PHASE GENERATOR CIRCUIT FOR CHARGE PUMP TYPE OR NEGATIVE SUPPLY CIRCUIT

BACKGROUND OF THE INVENTION

1. Field of the Invention

The present invention relates to electronic circuits that are supplied with a voltage and in which it is necessary to produce a negative voltage. More particularly, it relates to a phase signal generator circuit for a charge pump type of negative supply circuit.

2. Discussion of the Related Art

At present, negative high-voltage generator circuits of the charge pump type are coming into increasing use in integrated circuits. For example, the U.S. Pat. No. 5,077,691 describes a charge pump of this kind and its application to the programming of a flash type EEPROM memory.

FIG. 1 shows a partial block diagram of a known charge pump structure made by means of MOS technology using a P-type substrate. It has a set of n (with n representing a whole number) elementary cells C1 through Cn, the structure of each of which is shown in FIG. 2. These cells are series-connected between an input E and an output S. The aim of such a circuit, conventionally, is to produce a negative voltage VN from a positive supply voltage VCC and a reference voltage or ground, and to provide this negative voltage VN to a capacitive circuit (such as capacitor Cout in FIG. 1). These cells receive piloting signals (or phase signals) A, B, C and D (illustrated in the timing diagrams 3a through 3d), which cyclically switch between 0 volts (ground) and VCC.

An elementary cell (shown in FIG. 2) comprises:

an input IN to receive a voltage VIN, an output OUT to provide a voltage VOUT, and two inputs CKIN1 and CKIN2 to receive clock signals CK1 and CK2.

a first P-type transistor T whose drain is connected to the input IN and whose source is connected to the output OUT, a second P-type transistor T' whose source is connected to the input IN, whose drain is connected to the control gate of the first transistor T and whose control gate is connected to the output OUT, a first capacitor Ca whose first pole is connected to the control gate of the transistor T and whose second pole is connected to the input CKIN1, a second capacitor Cb whose first pole is connected to the output OUT and whose second pole is connected to the input CKIN2.

In practice, the capacitors Ca and Cb are made with P-type transistors, the first pole of these capacitors corresponding to a control gate of a transistor and the second pole corresponding to a drain and a source of the same transistor connected together.

The signals CK1 and CK2 will be, respectively, either the phase signals A and B shown in FIGS. 3a and 3c, or the phase signals C and D shown in FIGS. 3d and 3b.

Each cell therefore is piloted by a pair of phase signals (A and B) or (C and D). The phase signals that pilot a given cell are non-overlapping in the low state (i.e., the phase signals A and B or C and D, are not at 0 simultaneously).

Assuming that the phase signals A and D are initially at 0 volts and that the phase signals B and C are initially at VCC, the phase signals A, B, C and D are such that:

the increase to VCC of the phase signal A leads to the increase to VCC of the phase signal D, the increase to VCC of the phase signal D leads to the decrease to 0 of the phase signal B, the decrease to 0 of the phase signal B leads to the decrease to 0 of the phase signal C, with phase signal C rising to VCC after a certain period of time, the increase to VCC of the phase signal C leads to the increase to VCC of the phase signal B, the increase to VCC of the phase signal B leads to the decrease to 0 of the phase signal D, the decrease to 0 of the phase signal D leads to the decrease to 0 of the phase signal A, with phase signal A rising subsequently to VCC, and this pattern repeating continuously.

In one cell, negative charges are transferred from the input IN to the capacitor Cb on a falling edge of the signal CK1 (i.e., the falling edge of phase signal A or of phase signal C), the transistor T then being turned on. On a rising edge of this signal CK1, the transistor T is turned off. On a falling edge of the signal CK2 (i.e., the falling edge of phase signal B or phase signal D), the output voltage VOUT increases in absolute value by VCC.

Several of these cells may be connected together in series. Each consecutive cell in such a series of cells receives signals at its inputs CKIN1 and CKIN2 that are of opposite phase as the previous cell in the series. That is, if a particular cell receives phase signals A and B on its inputs CKIN1 and CKIN2, respectively, the cell preceding the particular cell and the cell following the particular cell receive phase signals C and D on their inputs CKIN1 and CKIN2, respectively. The input IN of the first cell C1 is connected to the input E, and the input E is connected to the ground. Negative charges are gradually transferred from one cell to the next and the negative output voltage VN (i.e., the voltage present at the output S of the last cell Cn) will gradually increase in absolute value.

The current trend is to produce charge pump circuits that work for a wide range of supply voltages, and that are capable of working from low supply voltages, for example, supply voltages of 3 volts or less.

The type of charge pump described above works accurately so long as the supply voltage VCC is high enough to turn the transistor T of each cell on, i.e., to create a drain-gate potential difference for each transistor that is greater than the threshold voltage of the transistors.

An aim of the present invention is to create a phase signal generator circuit that sets the rate of operation of the supply circuit as described above to enable the use of this supply circuit with low supply voltages.

SUMMARY OF THE INVENTION

Thus, an embodiment of the invention relates to a phase signal generator circuit for a charge pump of a negative supply circuit. The circuit cyclically produces a first pair of phase signals and a second pair of phase signals. It comprises a first circuit to produce a first phase signal of each pair of phase signals, these first phase signals being non-overlapping and switching between a voltage 0 and a voltage VCC, and second and third circuits for producing, from the first phase signals, respectively, the second phase signal of the first pair and the second phase signal of the second pair of phase signals, these second phase signals being non-overlapping with the first phase signals and switching between a negative voltage −V and a voltage VCC.

Another embodiment of the invention is directed towards an oscillator circuit configured to operate from a supply voltage and a ground. The oscillator circuit comprises: (a) a first oscillator configured to produce first and second phase signals, each of the first and second phase signals fluctuating between a high voltage and a low voltage, the first and second phase signals being out of phase with one another, and (b) a second oscillator coupled to the first oscillator to receive at least one of the first and second phase signals, the second oscillator being configured to produce third and fourth phase signals, each of the third and fourth phase signals fluctuating between a positive voltage and a negative voltage and being referenced to at least one of the first and second phase signals, the third and fourth phase signals not being at the negative voltage when the first and second phase signals, respectively, are at the low voltage.

Another embodiment of the invention is directed towards a power supply circuit. The power supply circuit comprises: (a) a charge pump having first and second clock inputs to control a charge flow rate between an input and an output of the charge pump, (b) a first oscillator having an output coupled to the first clock input of the charge pump, the first oscillator being configured to produce a first phase signal at its output that fluctuates between a high voltage and a low voltage and to be powered from the supply voltage and the ground, the first oscillator not being configured to receive a voltage of an opposite sign as the supply voltage in relation to the ground, and (c) a second oscillator having an output coupled to the second clock input of the charge pump, the second oscillator being configured to produce a second phase signal that oscillates between a positive voltage and a negative voltage in relation to the ground and to be powered from the supply voltage and the ground, the first oscillator not being configured to receive a voltage of an opposite sign as the supply voltage in relation to the ground.

According to yet another embodiment the invention is directed towards an oscillator circuit configured to operate from a supply voltage and a ground. The oscillator circuit comprises: (a) first oscillating means for producing first and second phase signals, each of the first and second phase signals fluctuating between a high voltage and a low voltage, the first and second phase signals being out of phase with one another, and (b) second oscillating means for producing third and fourth phase signals, the second oscillating means being coupled to the first oscillating means to receive at least one of the first and second phase signals, each of the third and fourth phase signals fluctuating between a positive voltage and a negative voltage and being referenced to at least one of the first and second phase signals, the third and fourth phase signals not being at the negative voltage when the first and second phase signals, respectively, are at the low voltage.

According to another embodiment the invention is directed to a power supply circuit. The power supply circuit comprises: (a) a charge pump having first and second clock inputs to control a charge flow rate between an input and an output of the charge pump, (b) first oscillating means for producing a first phase signal that fluctuates between a high voltage and a low voltage at an output of the first oscillating means, the output of the first oscillating means being coupled to the first clock input of the charge pump, the first oscillating means being configured to be powered from the supply voltage and the ground and not being configured to receive a voltage of an opposite sign as the supply voltage in relation to the ground, and (c) second oscillating means for producing a second phase signal that oscillates between a positive voltage and a negative voltage in relation to the ground, the second oscillating means having an output coupled to the second clock input of the charge pump, the second oscillating means being configured and to be powered from the supply voltage and the ground and not being configured to receive a voltage of an opposite sign as the supply voltage in relation to the ground.

Yet another embodiment of the invention is directed to a method for producing at least two sets of first and second phase signals from a positive supply voltage and a ground, the second phase signals having both a positive and a negative voltage level in reference to the ground. The method comprises the steps of: (a) providing the positive supply voltage and the ground to first and second oscillator circuits, the first and second oscillator circuits not being provided with a voltage of an opposite sign as the supply voltage in relation to the ground, (b) creating at least two first phase signals with the first oscillator circuit that oscillate between a high voltage and a low voltage and that are out of phase with one another, and (c) creating second phase signals with the second oscillator circuit that oscillate between a positive voltage and a negative voltage in relation to the ground.

Another embodiment, a method for piloting a charge pump circuit using a supply voltage and a ground, comprises the steps of: (a) providing a supply voltage and a ground to first and second oscillator circuits, the first and second oscillator circuits not being provided with a voltage of an opposite sign as the supply voltage in relation to the ground; (b) creating a first phase signal with the first oscillator circuit, the first phase signal oscillating between a high voltage and a low voltage; (c) providing the first phase signal to a first clock input of a first charge pump cell; (d) creating a second phase signal with the second oscillator circuit, the second phase signal oscillating between a positive voltage and a negative voltage in relation to the ground, and (e) providing the second phase signal to a second clock input of the first charge pump cell.

BRIEF DESCRIPTION OF THE DRAWINGS

Other particular features and advantages shall appear from the following description, made with reference to the appended drawings, of which:

FIG. 1 is a partial block diagram of a prior art negative voltage generating circuit that uses a charge pump;

FIG. 2 is a schematic diagram of a basic cell of the circuit of FIG. 1;

FIG. 3a through 3d are timing diagrams showing piloting signals (or phase signals) of the circuit of FIG. 1;

FIGS. 4a through 4d are timing diagrams showing phase signals produced by a phase signal generator circuit according to the invention;

FIG. 5 is a block diagram of a phase signal generator circuit according to the invention; and FIGS. 6, 7, 8a and 8b are schematic diagrams of the internal circuits of the circuit of FIG. 5.

DETAILED DESCRIPTION

FIG. 1 is a partial block diagram of a known pump structure formed, for example, using MOS transistors on a P-type substrate. It comprises a set of n (with n representing an integer) elementary cells C1 through Cn, the structure of each of which is shown in FIG. 2. These cells are series-connected between an input E and an output S. Conventionally, the aim of a circuit of this kind is to supply a capacitive circuit (such as capacitor Cout in FIG. 1) with a negative voltage VN, which negative voltage is produced from a positive supply voltage VCC and a reference voltage or ground. These cells receive piloting signals (or phase signals) A, B, C and D (illustrated in the timing diagrams of FIGS. 3a through 3d), which switch cyclically between 0 volts (ground) and VCC.

Each cell therefore is piloted by a pair of phase signals (A and B) or (C and D), the phase signals piloting a given cell being non-overlapping in the low state (i.e., the phase signals A and B, or C and D, are not at 0 simultaneously).

An elementary cell (shown in FIG. 2) comprises:

an input IN to receive a voltage VIN, an output OUT to provide a voltage VOUT, and two inputs CKIN1 and CKIN2 to receive clock signals CK1 and CK2.

a first P-type transistor T whose drain is connected to the input IN and whose source is connected to the output OUT.

a second P-type transistor T' whose source is connected to the input IN, whose drain is connected to the control gate of the first transistor T and whose control gate is connected to the output OUT, a first capacitor Ca whose first pole is connected to the control gate of the transistor T and whose second pole is connected to the input CKIN1, a second capacitor Cb whose first pole is connected to the output OUT and whose second pole is connected to the input CKIN2.

In practice, the capacitors Ca and Cb are made with P-type transistors, the first pole of these capacitors corresponding to a control gate of a transistor and the second pole corresponding to a drain and a source of the same transistor connected together.

The signals CK1 and CK2 will be, respectively, either the phase signals A and B shown in FIGS. 3a and 3c, or the phase signals C and D shown in FIGS. 3d and 3b.

Each cell therefore is piloted by a pair of phase signals (A and B) or (C and D). The phase signals that pilot a given cell are non-overlapping in the low state (i.e., the phase signals A and B or C and D, are not at 0 simultaneously).

Assuming that the phase signals A and D are initially at 0 volts and that the phase signals B and C are initially at VCC, the phase signals A, B, C and D are such that:

the increase to VCC of the phase signal A leads to the increase to VCC of the phase signal D, the increase to VCC of the phase signal D leads to the decrease to 0 of the phase signal B, the decrease to 0 of the phase signal B leads to the decrease to 0 of the phase signal C, with phase signal C rising to VCC after a certain period of time, the increase to VCC of the phase signal C leads to the increase to VCC of the phase signal B, the increase to VCC of the phase signal B leads to the decrease to 0 of the phase signal D, the decrease to 0 of the phase signal D leads to the decrease to 0 of the phase signal A, with phase signal A rising subsequently to VCC, and this pattern repeating continuously.

In one cell, negative charges are transferred from the input IN to the capacitor Cb on a falling edge of the signal CK1 (namely of phase signal A or of phase signal C), the transistor T then being turned on. On a rising edge of this signal CK1, the transistor T is turned off. On a falling edge of the signal CK2 (namely of phase signal B or of phase signal D), the output voltage VOUT increases in absolute value by VCC.

Several of these cells may be connected together in series. Each consecutive cell in such a series of cells receives signals at inputs CKIN1 and CKIN2 that are of opposite phase as the previous cell in the series. That is, if a particular cell receives phase signals A and B on its inputs CKIN1 and CKIN2, respectively, the cell preceding the particular cell and the cell following the particular cell receive phase signals C and D on their inputs CKIN1 and CKIN2, respectively. The input IN of the first cell C1 is connected to the input E, and the input E is connected to the ground. Negative charges are gradually transferred from one cell to the next and the negative output voltage VN (i.e., the voltage present at the output S of the last cell Cn) will gradually increase in absolute value.

FIG. 5 provides a schematic illustration of a phase signal generator circuit made according to the invention. This circuit could be made, for example, with MOS technology using a P-type substrate. It could be implemented in an integrated circuit (e.g., a memory) comprising a charge pump, such as the one described with reference to FIGS. 1 and 2, to produce the piloting signals for such a pump.

The circuit shown in FIG. 5 produces four phase signals A'boost, B', C'boost and D', which are illustrated by FIGS. 4a through 4d. These phase signals are sequenced in a similar manner as are the phase signals A, B, C and D (illustrated in FIGS. 3a through 3d). The phase signals A'boost and C'boost, whose states pilot the transfer of charges in the cells C1 through Cn of the pump shown in FIG. 1, switch between a negative voltage −V and the supply voltage VCC (and not between the voltage 0 and the voltage VCC as do the phase signals A and C shown in FIGS. 3a and 3d).

Thus, assuming that the phase signal A'boost (illustrated in FIG. 4a) is at a negative potential −V, that the phase signal D' (illustrated in FIG. 4b) is initially at 0 and that the phase signals B' and C'boost (illustrated in FIGS. 4c and 4d) are initially at VCC, the phase signals A'boost, B', C'boost and D' are such that:

the increase to VCC of the phase signal A'boost leads to the increase to VCC of the phase signal D', the increase to VCC of the phase signal D' leads to the decrease to 0 of the phase signal B', the decrease to 0 of the phase signal B' leads to the decrease to 0 of the phase signal C'boost, with phase signal C'boost further descending to −V and then rising to VCC after a certain period of time, the increase to VCC of the phase signal C'boost leads to the increase to VCC of the phase signal B', the increase to VCC of the phase signal B' leads to the decrease to 0 of the phase signal D', the decrease to 0 of the phase signal D' leads to the decrease to 0 of the phase signal A'boost, with phase signal A'boost further descending to −V and then rising subsequently to VCC, and this pattern repeating continuously.

The phase generator shown in FIG. 5 comprises a circuit OSC1 that produces the phase signals B' and D', a circuit OSC2 that produces the phase signal A'boost, and a circuit OSC3 that produces the phase signal C'boost. Finally, it comprises a control circuit CDE that produces command signals provided to the circuits OSC2 and OSC3, as shall be seen further below.

Before describing the operation of the circuit of FIG. 5, a description shall be given of an exemplary embodiment of each portion of this circuit.

An exemplary embodiment of the circuit OSC1 is shown in FIG. 6.

The circuit OSC1 has three inputs and two outputs. One input 1 receives a control logic signal ON. One output 2 provides the phase signal D'. An output 3 provides the phase signal B'. An input 4 receives a command signal RESX provided by the circuit OSC2. An input 5 receives a command signal RESN provided by the circuit OSC3.

The circuit OSC1 has a two-input NAND gate G1 that receives the signal RESX and the phase signal B' at its inputs. The output of the gate G1 is connected to two series-connected invertors I1 and I2, the output of the second inverter I2 providing the phase signal D'. The circuit OSC1 further comprises a second three-input NAND logic gate G2 that receives the signals ON, RESN and the phase signal D' at its inputs. The output of the gate G2 is connected to two series-connected invertors I3 and I4, the output of the second inverter I4 providing the phase signal B'.

An exemplary embodiment of the circuit CDE is illustrated in FIG. 7.

The control circuit CDE has four inputs and two outputs.

At two inputs 14 and 15, it receives a command signal A' and a command signal STOPX, respectively, which are produced by the circuit OSC2. At two inputs 16 and 17, it receives a command signal C' and a command signal STOPN, respectively, which are produced by the circuit OSC3. Finally, at two outputs 18 and 19, it provides, respectively, two command signals RCX and RCN.

The circuit CDE has two two-input NAND logic gates G3 and G4. The logic gate G3 receives the signal A' at one input and at its other input is connected to the output of the gate G4. The logic gate G4 receives the signal C' at one input and its other input is connected to the output of the gate G3. The output of the gate G4 is connected to the first pole of a resistor R. The resistor R has its second pole connected to the first pole of a capacitor C1. The capacitor C1 has its second pole connected to the ground. The first pole of the capacitor C1 (corresponding to the output of RC circuit formed by the resistor R and the capacitor C1) is connected to three series-connected invertors I6, I7 and I8. The output of the second inverter I7 provides the signal RCX and the output of the third the inverter I8 provides the signal RCN, which is complementary to the signal RCX. Finally, the circuit CDE has two transistors T1 and T2, which are, respectively, P-type and N-type transistors. The first transistor T1 has its drain connected to the input of the inverter I6 and its source receives the supply voltage VCC. Its control gate receives the signal STOPN. The second transistor T2 has its drain connected to the input of the inverter I6 and its source is connected to the ground. Its control gate receives the complementary signal of the signal STOPX, this complementary signal being produced by an inverter I5 whose input is connected to the inverter I5.

An exemplary embodiment of the circuit OSC2 is illustrated in FIG. 8A.

The circuit OSC2 has four inputs and four outputs. An input 6 receives the signal ON. An input 7 receives the phase signal D', which is produced by the circuit OSC1. An input 8 receives the phase signal C'boost, which is produced by the circuit OSC3. Finally, an input 9 receives the signal RCX, which is produced by the circuit CDE. An output 10 provides the signal RESX. An output 11 provides the signal A'. An output 12 provides the signal STOPX. An output 13 provides the phase signal A'boost.

The circuit OSC2 has four P-type transistors T4, T5, T6 and T7. A first transistor T4 has its source connected to the input 7. Its drain is connected to the output 13. Its control gate is connected to the second pole of the capacitor C2, whose first pole is connected to the input 7. SWX is the reference given to the signal present at the second pole of the capacitor C2. The second transistor T5 has its source connected to the ground. Its drain is connected to the second pole of the capacitor C2. Its control gate is connected to the input 8. The third transistor T6 receives the voltage VCC at its source. Its drain is connected to the second pole of the capacitor C2. Its control gate is connected to the drain of the transistor T4 by means of two series-connected invertors I9 and I10. The control gate of the transistor T6 therefore receives the phase signal A'boost delayed by the invertors I9 and I10. The fourth transistor T7 receives the voltage VCC at its source. Its drain is connected to the drain of the transistor T4. Its control gate is connected to the output 12 and therefore receives the signal STOPX.

The circuit OSC2 has a two-input NAND logic gate G5, a first input of which is connected to the control gate of the transistor T4 (and therefore receives the signal SWX), and the second input of which is connected to the output 12 (and therefore receives the signal STOPX). The output of the gate G5 is connected to the output 11 by means of two series-connected invertors I11 and I12. The output 11 also is connected to the output 13 by means of a capacitor C3.

The circuit OSC2 produces the signals STOPX and RESX from the signals ON, RCX and SWX and from the phase signal A'boost. To do this, it has two two-input NAND logic gates G6 and G8 and one three-input NAND logic gate G7. The gate G6 receives the signal RCX at one input. Its other input is connected to the output of the gate G7. The gate G7 receives the signal ON at one input. It has another input connected to the output of the gate G6, and its last input receives the signal SWX. The gate G8 receives the signal SWX at one input and the phase signal A'boost at its other input. The output of the gate G7 provides the signal STOPX. The output of the gate G8 provides the signal RESX.

The circuit OSC3, illustrated in FIG. 8b has a structure similar to that of the circuit OSC2.

The circuit OSC3 has four inputs and four outputs. An input 6' receives the signal ON. An input 7' receives the phase signal B' produced by the circuit OSC1. An input 8' receives the phase signal A'boost produced by the circuit OSC2. Finally, an input 9' receives the signal RCN produced by the circuit CDE. An output 10' provides the signal RESN. An output 11' provides the signal C'. An output 12' provides the signal STOPN. An output 13' provides the phase signal C'boost.

The circuit OSC3 has four P-type transistors T'4, T'5, T'6 and T'7. A first transistor T'4 as its source connected to the input 7'. Its drain is connected to the output 13'. Its control gate is connected to the second pole of a capacitor C'2, whose first pole is connected to the input 7'. SWN is the reference given to the signal present at the second pole of the capacitor C'2. The second transistor T'5 has its source connected to the ground. Its drain is connected to the second pole of the capacitor C'2. Its control gate is connected to the input 8'. The third transistor T'6 receives the voltage VCC at its source. Its drain is connected to the second pole of the capacitor C'2. Its control gate is connected to the drain of the transistor T'4 by means of two series-connected invertors I'9 and I'10. The control gate of the transistor T'6 therefore receives the phase signal C'boost delayed by the inventors I'9 and I'10. The fourth transistor T'7 receives the voltage VCC at its source. Its drain is connected to the drain of the transistor T'4. Its control gate is connected to the output 12', and therefore receives the signal STOPN.

The circuit OSC3 has a NAND logic gate G'5 with two inputs, a first input of which is connected to the control gate of the transistor T'4 (and therefore receives the signal SWN), and the second input of which is connected to the output 12' (and therefore receives the signal STOPN). The output of the gate G'5 is connected to the output 11' by means of two series-connected invertors I'11 and I'12. The output 11' also is connected to the output 13' by means of the capacitor C'3.

The circuit OSC3 produces the signals STOPN and RESN from the signals ON, RCN, SWN and from the phase signal C'boost. To do this, it has two two-input NAND logic gates G'6 and G'8 and one three-input NAND logic gate G'7. The gate G'6 receives the signal RCN at one input. Its other input is connected to the output of the gate G'7. The gate G'7 receives the ON signal at one input. It has another input connected to the output of the gate G'6, and its last input receives the signal SWN. The gate G'8 receives the signal SWN at one input and the phase signal C'boost at another input. The output of the gate G'7 provides the signal STOPN. The output of the gate G'8 provides the signal RESN.

Having described an exemplary embodiment of each section of the phase generating circuit illustrated by FIG. 5, its operation will now be explained.

It shall be assumed that the signal ON is in the high state, i.e., at VCC. This signal enables the stopping or activation of the production of the phase signals as illustrated in FIGS. 4a to 4d. In any case, it is quite possible to do without the signal ON. Without the signal ON, the gates G2, G7 and G'7 would be two-input NAND gates and the circuit would produce the phase signals continuously. However, the drawback of such an approach is that power would be consumed continuously.

It shall further be assumed that the phase signal A'boost is in the low state (i.e., at −V, with the absolute value of −V being less than or equal to VCC), that the output of the gate G5 is at 0 volts, that the phase signals B' and C'boost are in the high state (VCC), that the phase signal D' is in the low state (0 volts), that the signals RCX, RESX, STOPX and SWX are at VCC, that the signals RESN, STOPN and C' are at VCC, that the signals RCN, A' and SWN are at 0 volts and that the voltage of the non-grounded terminal of the capacitor C1 is initially equal to VCC.

Since the inputs of the gate G4 are at VCC, the voltage of the non-grounded terminal of capacitor C1 will be canceled. The signal RCX therefore will go to 0 volts (the signal RCN going to VCC). The output of the gate G6 therefore will go to VCC. The signal STOPX therefore goes from VCC to 0 volts.

With the signal STOPX going to 0 volts, the output of the gate G5 will go from 0 volts to VCC and the phase signal A'boost will go to 0. At the same time, with the transistor T7 turning on, the phase signal A'boost will gradually rise to VCC (as the capacitor C3 is charges).

Thus, the phase signal A'boost goes from −V to 0, and then to VCC, which means the signal RESX will go to 0 volts. Since the transistor T'5 was turned on prior to A'boost going to VCC, however, capacitor C'2 is charged to 0 volts, so the signal SWN therefore is kept at 0 volts.

When the signal STOPX goes to 0 volts, the transistor T2 (which is initially turned off, as is the transistor T1) turns on. This keeps the signal RCX at 0 volts.

With the signal RESX going to 0 volts, the signal produced by the gate G1 will go to VCC. Subsequently, the phase signal D' will go from 0 volts to VCC after a certain delay induced by the presence of the inventors I1 and I2.

With the phase signal D' going from 0 volts to VCC, the output of the gate G2 will go from VCC to from 0 volts. The phase signal B' therefore will go from VCC to 0 volts with a certain delay induced by the presence of the inventors I3 and I4.

When the phase signal B' goes from VCC to 0 volts, the signal SWN, initially at 0 volts, will go to −VCC (the negative bootstrap phase of the phase signal B'). The transistor T'4 then turns on, and the phase signal C'boost is reduced from VCC to 0 volts. The transistor T'6 will turn on. This takes the signal SWN to VCC. With the signal STOPN being at VCC, the signal at output of the gate G'5 will go to 0 volts. This has the effect of causing a drop in the phase signal C'boost to −V, the value of −V being a function of the value of the capacitor C3. In any case, −V cannot have an absolute value that is greater than VCC.

The drop in the signal C' leads, at the same time, to the gradual rise of the voltage of the on-grounded terminal of the capacitor C1 to VCC. Consequently, with a certain delay caused by the charging of capacitor C1, the signals RCX and RCN will change state. RCN will fall to 0 volts and RCX will rise to VCC. The descent of the signal RCN will lead to a descent to 0 volts of the signal STOPN. The transistor T1 is then turned on. This maintains the state of the signals RCN and RCX.

The output of the gate G'5 switches when the signal STOPN goes to 0 volts. The signal C' therefore will go to VCC and the transistor T'7 will turn on. Consequently, the phase signal C'boost goes to VCC.

With the signal SWN having risen to VCC and the phase signal C'boost also going to VCC, the output of the gate G'8 will switch, the signal RESN then going from VCC to 0 volts. Consequently, the phase signal B' will go to VCC, with a certain delay induced by the presence of the invertors I3 and I4.

At the same time, the buildup of the phase signal C'boost causes the transistor T'6 to be turned off. The signal SWN therefore will fall back to 0 volts, the transistor T'5 being turned on. Consequently, the signal STOPN will rise again to VCC, thus turning the transistor T1 off.

The buildup to VCC of the phase signal B' causes a drop, through the gate G1 and the invertors I1 and I2, in the phase signal D' to 0 volts after a certain delay.

The descent of the phase signal D' will lead to the descent to 0 volts of the phase signal A'boost, the transistor T5 having precharged the second pole of the capacitor C2 to 0 volts. Indeed, the descent of the phase signal D' will lead to the descent to 31 VCC of the signal SWX. This turns the transistor T4 on (by the negative bootstrapping of the phase signal D'). The phase signal A'boost therefore will go from VCC to 0 volts.

With the phase signal A'boost going to 0 volts, the transistor T6 will turn on. This takes the signal SWN to VCC. With the signal STOPX being at VCC, the signal at output of the gate G5 will go to 0 volts. This has the effect of causing a drop in the phase signal A'boost to −V, the value of −V being a function of the value of the capacitor C3.

Thus, the initial conditions are obtained again. Another cycle will begin. The voltage at the non-grounded terminal of the capacitor C1, which was charged to VCC by the transistor T1, will gradually drop to 0 volts, the output of the gate G4 being at 0 volts. Consequently, the signal RCX will go back to 0 volts. This will cause a drop to 0 volts in the signal STOPX. The output of the gate G5 therefore will switch and the phase signal A'boost will go to 0 volts, and then to VCC, the transistor T7 turning on.

It should be noted that by using the command signals A' and C' instead of A'boost and C'boost to pilot a charge pump, the conventional control of a pump such as that described with reference to FIGS. 3a through 3d is achieved. This particular feature is especially valuable if it is desired to use a variable supply voltage VCC. For low supply voltages, for example, 3 volts, the phase signals A'boost, B', C'boost and D' will be used. For higher supply voltages, for example equal to 5 volts, it is preferable to use A', B', C'and D'. Indeed, the potential difference between the low and high states of A'boost and C"boost could then reach a value (10 volts in the example considered) such that it is necessary to use high-voltage transistors in the pumping cells, especially if the time taken to switch from one state to another is short. These high-voltage transistors generally are bulkier and perform less efficiently in terms of switchover time. Assuming a high supply voltage, it is therefore advantageous to limit the amplitudes of the phase signals by using piloting phase signals that are not negatively bootstrapped.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A phase generator circuit for a negative supply circuit that uses a charge pump, the phase generator circuit cyclically producing a pair of first phase signals and a pair of second phase signals, comprising:

a first circuit to produce first phase signals, the first phase signals having non-overlapping low states and switching between zero volts and a positive voltage VCC, and second and third circuits to respectively receive one of the pair of first phase signals and produce one of the pair of second phase signals, each of the pair of second phase signals having non-overlapping low states with a respective one of the pair of first phase signals and switching between a negative voltage −V and a positive voltage VCC.

2. A circuit according to claim 1, wherein the second and third circuits produce the second phase signals by a negative bootstrapping of the first phase signals.

3. A circuit according to claim 2, wherein each of the second and third circuits comprises:

means for precharging, to the positive voltage VCC, second terminals of capacitors, means for selectively connecting the second terminals of the capacitors to inputs, the inputs receiving the first phase signals when the first phase signals switch from the positive voltage VCC to zero volts to bring a potential of the second phase signals to zero volts, and logic gates having outputs, wherein the outputs of the logic gates are connected to first terminals of the capacitors and switch from the positive voltage VCC to zero volts, after the first phase signals have been brought to zero volts, to bring the second phase signals to negative voltage.

4. A circuit according to claim 3, wherein the means for selectively connecting the second terminals of the capacitors to the inputs are transistors whose control gates are connected to be controlled by the negative bootstrapping of the first phase signals.

5. A phase signal generator circuit, comprising:

a first oscillator to produce first and second signals such that each of the first and second signals fluctuates between a high voltage and a low voltage and the first and second signals have non-overlapping low states; and a second oscillators, coupled to the first oscillator, to receive the first and second signals and to produce third and fourth signals such that each of the third and fourth signals fluctuates between a positive voltage and a negative voltage and the third and fourth signals are not at the negative voltage when the first and second signals, respectively, are at the low voltage.

6. The phase signal generator circuit as claimed in claim 5, wherein the second oscillator includes second and third separate oscillators to produce the third and fourth signals, respectively each of the second and third oscillators being coupled to the first oscillator to receive one of the first and second phase signals.

7. The phase signal generator circuit as claimed in claim 6, further comprising a control circuit, coupled to the second and third oscillators, to provide command signals to synchronize the second and third oscillators.

8. The phase signal generator circuit as claimed in claim 6, wherein the second and third oscillators respectively comprise first and second output capacitors, a first terminal of the first output capacitor being coupled to an output of the second oscillator and a first terminal of the second output capacitor being coupled to an output of the third oscillator, the second terminals of the first and second output capacitors being connected to receive respective first voltages that decrease during first time intervals, thereby causing respective second voltages at the first terminals to decrease during the first time intervals.

9. The phase signal generator circuit as claimed in claim 8, wherein the second oscillator includes a first transistor coupled between the first terminal of the first output capacitor and an input of the second oscillator, and the third oscillator includes a second transistor coupled between the first terminal of the second output capacitor and put of the third oscillator thereby establishing conductance paths through the first and second transistors that allow the first terminals of the first and second output capacitors to be charged by voltages present at the inputs of the second and third oscillators during second time intervals.

10. The phase signal generator circuit as claimed in claim 9, wherein the second and third oscillators respectively comprise first and second input capacitors having first terminals coupled to the respective inputs of the second and third oscillators and second terminals coupled to respective control gates of the transistors, the first and second input capacitors being connected to receive decreasing third voltages on their respective first terminals during respective third time intervals, thereby producing decreasing fourth voltages on the respective second terminals of the first and second input capacitors and turning on the first and second transistors during the respective third time intervals.

11. The phase signal generator circuit as claimed in claim 6, wherein the first oscillator includes first and second logic gates with outputs of the first and second logic gates being coupled, respectively, to inputs of first and second delay circuits, and with outputs of the first and second delay circuits being coupled, respectively, to inputs of the second and first logic gates.

12. The phase signal generator circuit as claimed in claim 5, further comprising a charge pump circuit having first and second charge pump cells coupled together, each of the first and second charge pump cells having first and second clock inputs, and wherein the first and second charge pump cells are coupled to the oscillator to receive, respectively, the first and third signals on the first and second clock inputs of the first charge pump cell and, respectively, the second and fourth signals on the first and second inputs of the second charge pump cell.

13. A power supply circuit, comprising:
- a charge pump having first and second clock inputs to control a charge flow rate between an input and an output of the charge pump;
- an oscillator having first and second outputs coupled, respectively to the first and second clock inputs of the charge pump, wherein the oscillator is powered from a supply voltage and a reference voltage and produces a first phase signal that fluctuates between a high voltage and a low voltage and a second phase signal that oscillates between a positive voltage and a negative voltage, which is lower than reference voltage, the second phase signal not being at the negative voltage when the first phase signal is at the low voltage.

14. The phase signal generator circuit as claimed in claim 5, wherein the oscillator produces the third and fourth signals so that the third and fourth signals are at the negative voltage at least a portion of each time that the second and first signals, respectively, are at the low voltage.

15. A phase signal generator circuit, comprising:
- first oscillating means for producing first and second signals, each of the first and second signals fluctuating between a high voltage and a low voltage, the first and second phase signals not being at the low voltage simultaneously; and
- second oscillating means for producing third and fourth signals, the second oscillating means being coupled to the first oscillating means to receive the first and second signals, each of the third and fourth signals fluctuating between a positive voltage and a negative voltage, which is lower than the low voltage, the third and fourth signals not being at the negative voltage when the first and second signals, respectively, are at the low voltage.

16. A power supply circuit, comprising:
- a charge pump having first and second clock inputs to control a charge flow rate between an input and an output of the charge pump; and
- means for producing a first phase signal that fluctuates between a high voltage and a low voltage at a first output and for producing a second phase signal that oscillates between a positive voltage and a negative voltage, which is lower than the low voltage, at a second output, the second phase signal not being at the negative voltage when the first phase signal is at the low voltage, wherein the first output is coupled to the first clock input of the charge pump and the second output is coupled to the second clock input of the charge pump.

17. The phase signal generator or circuit as claimed in claim 15, wherein the oscillator produces the fourth and third signals so that the fourth and third signals are at the negative voltage at least part of each time the first and second signals, respectively, are at the low voltage.

18. A method for producing a pair of first phase signals and a pair of second phase signals from a positive supply voltage and a ground, comprising the steps of:
- providing the positive supply voltage and the ground to an oscillator circuit;
- generating the pair of first phase signals with the oscillator circuit so that the first phase signals oscillate between a high signal voltage and a low signal voltage and are not at the low signal voltage simultaneously; and
- generating the pair of second phase signals with the oscillator circuit so that the second phase signals oscillate between a positive signal voltage and a negative signal voltage, which is lower than the ground, and so that each of the pair of second phase signals is not at the negative voltage when a respective one of the pair of first phase signals is at the low voltage.

19. The method of claim 18, wherein the step of generating the second phase signals with the oscillator circuit includes bootstrapping the first phase signals to produce the second phase signals.

20. A method for driving a charge pump circuit using a supply voltage and a ground, comprising the steps of:
- providing the supply voyage and the ground to an oscillator circuit;
- generating a first signal with the oscillator circuit that oscillates between a high voltage and a low voltage;
- providing the first signal to a first clock input of a first charge pump cell;
- generating a second signal with the oscillator circuit that oscillates between a positive voltage and a negative voltage which is lower than the ground, the second signal not being at the negative voltage when the first signal is at low voltage; and
- providing the second signal to a second clock input of the first charge pump cell.

21. The method of claim 20, further comprising the steps of: generating a third signal with the oscillator circuit that oscillates between the high voltage and the low voltage and that is not at the low voltage when the first signal is at the low voltage;
- providing the third signal to a first clock input of a second charge pump cell;
- generating a fourth signal with the oscillator circuit that oscillates between the positive voltage and the negative voltage and that is not at the negative voltage when the second signal is at the low voltage; and
- providing the fourth signal to a second clock input of the second charge pump cell.

* * * * *